(12) United States Patent
Wang (10) Patent No.: US 8,068,192 B2
(45) Date of Patent: Nov. 29, 2011

(54) LCD ASSEMBLY

(75) Inventor: Huan-Huan Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 262 days.

(21) Appl. No.: 12/504,900

(22) Filed: Jul. 17, 2009

(65) Prior Publication Data

US 2010/0283934 A1 Nov. 11, 2010

(30) Foreign Application Priority Data

May 11, 2009 (CN) .................. 2009 2 0303029 U (51) Int. Cl.
*G02F 1/1333* (2006.01)

(52) U.S. Cl. .......................................... 349/58; 248/921
(58) Field of Classification Search .......... 349/917–923, 349/58; 248/917–923
See application file for complete search history.

(56) References Cited

U.S. PATENT DOCUMENTS

| 7,472,458 B2 * | 1/2009 | Oddsen, Jr. ..................... 16/255 |
| 2007/0205341 A1 * | 9/2007 | Chih et al. .................. 248/125.9 |

* cited by examiner

*Primary Examiner* — Richard Kim
(74) *Attorney, Agent, or Firm* — Altis Law Group, Inc.

(57) ABSTRACT

An LCD assembly includes an LCD, a support member, a sliding member and a bracket. The support member engages the LCD, and the LCD is rotatable about an axis of the support member about a first axis. The sliding member engages the support member, and is rotatable about an axis of the support member about a second axis perpendicular to the first axis. The bracket is configured for receiving the sliding member, and the sliding member is slidable in the bracket.

19 Claims, 8 Drawing Sheets

LCD ASSEMBLY

BACKGROUND

1. Technical Field

The present disclosure relates to Liquid Crystal Displays (LCDs), and particularly to an LCD assembly with a rotatable LCD.

2. Description of Related Art

Displays are used in many kinds of electronic devices, such as personal computers, servers, or notebooks. Most can only be rotated to adjust visual angle along a single axis. This limits the ability of the display to meet user requirements.

BRIEF DESCRIPTION OF THE DRAWINGS

Many aspects of the disclosure can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
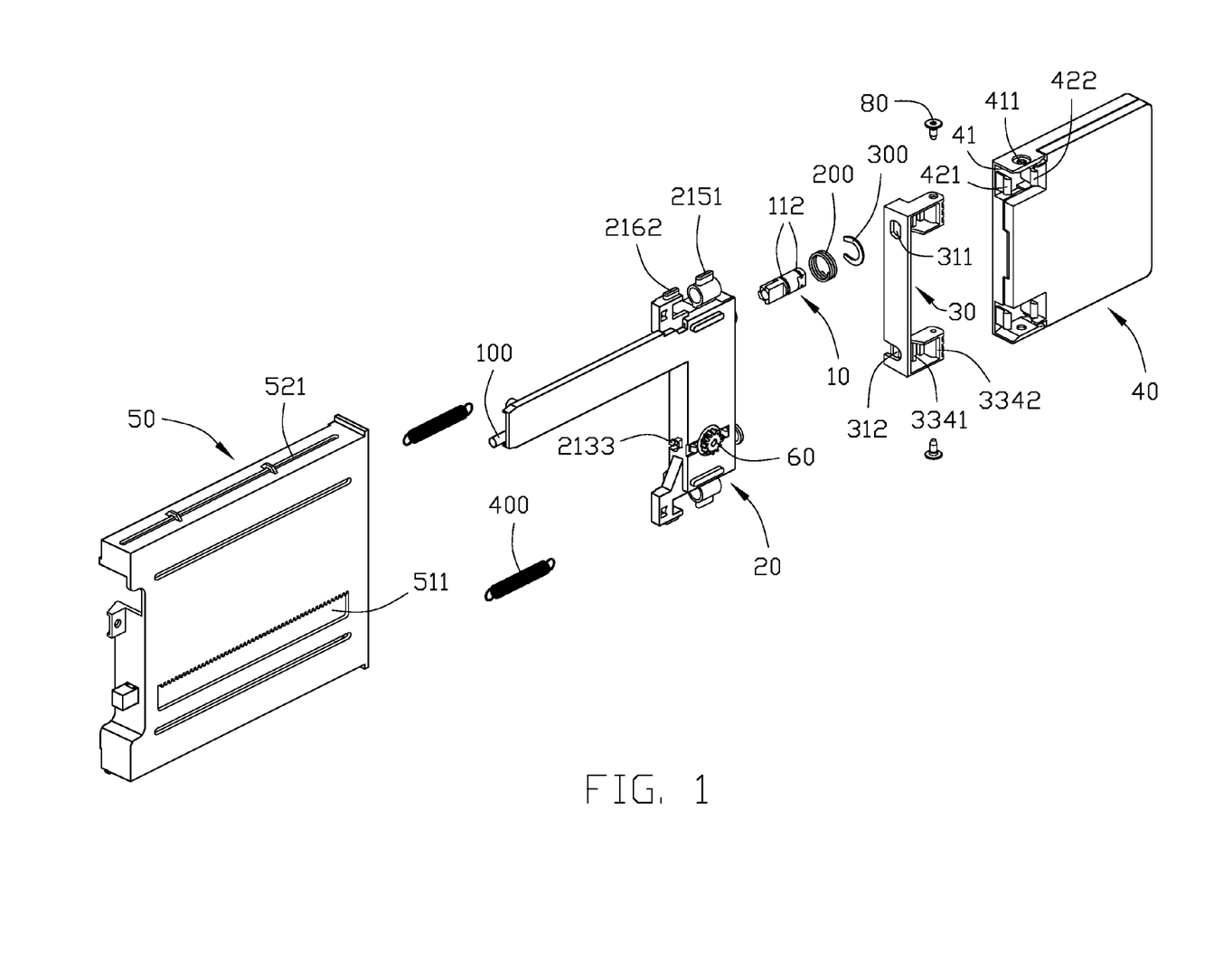
FIG. 1 is an exploded, isometric view of an LCD assembly.
Figure 3:
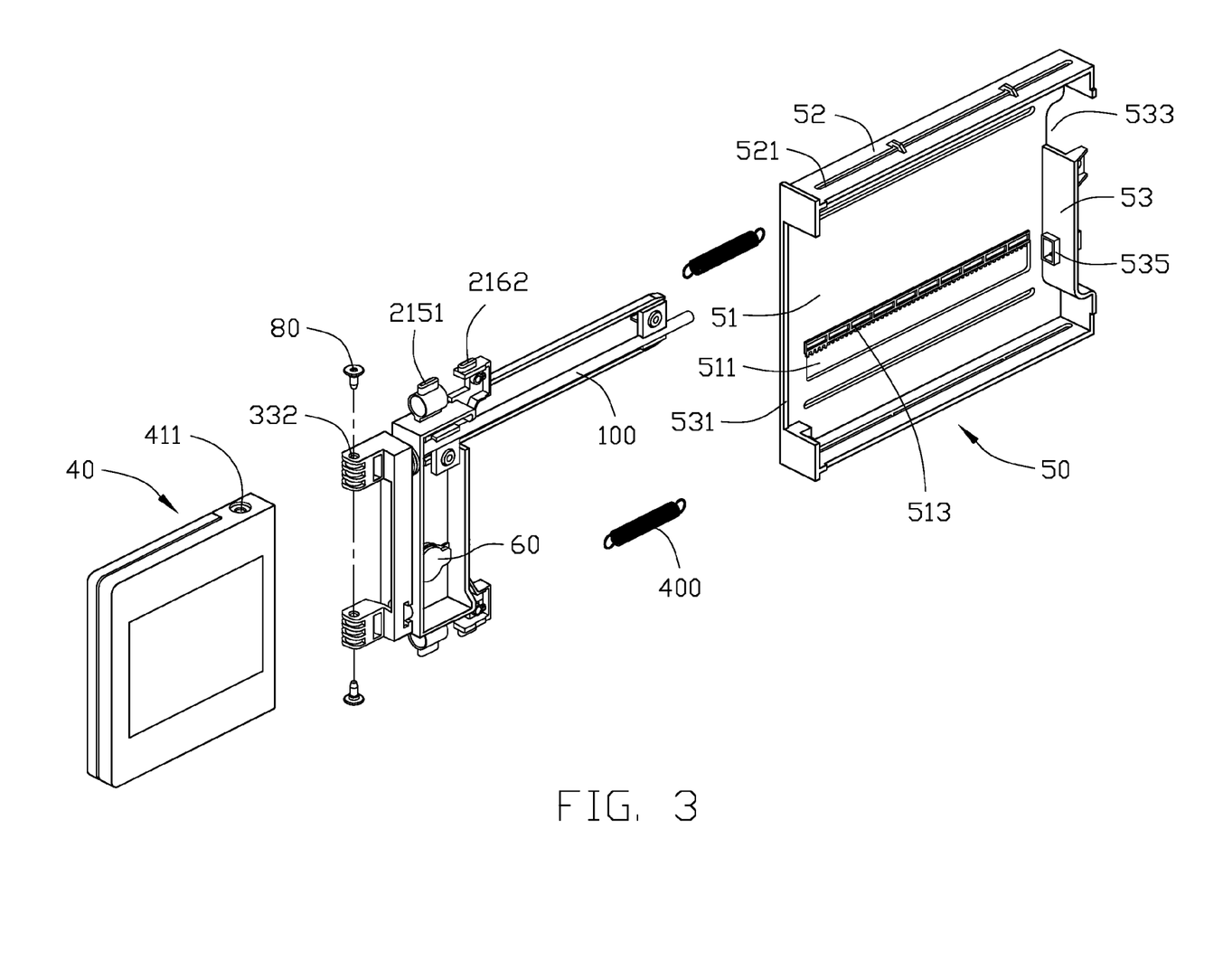
FIG. 3 is an isometric view of the LCD, the support member together with the sliding member and the connecting member, and the bracket of FIG. 1.

Referring to FIGS. 1 and 3, an embodiment of an LCD assembly includes an LCD 40, a support member 30, a sliding member 20, a connecting member 10 configured for connecting the support member 30 and the sliding member 20, and a bracket 50.

The LCD 40 defines a pair of first pivot holes 411 in two parallel sidewalls thereof, and two holding slots 41 in a rear wall adjacent to the first pivot holes 411. The rear wall is generally perpendicular to the sidewalls. First and second hooks 421, 422 are formed in each of the holding slots 41, and extend generally perpendicular to the rear wall.

Figure 2:
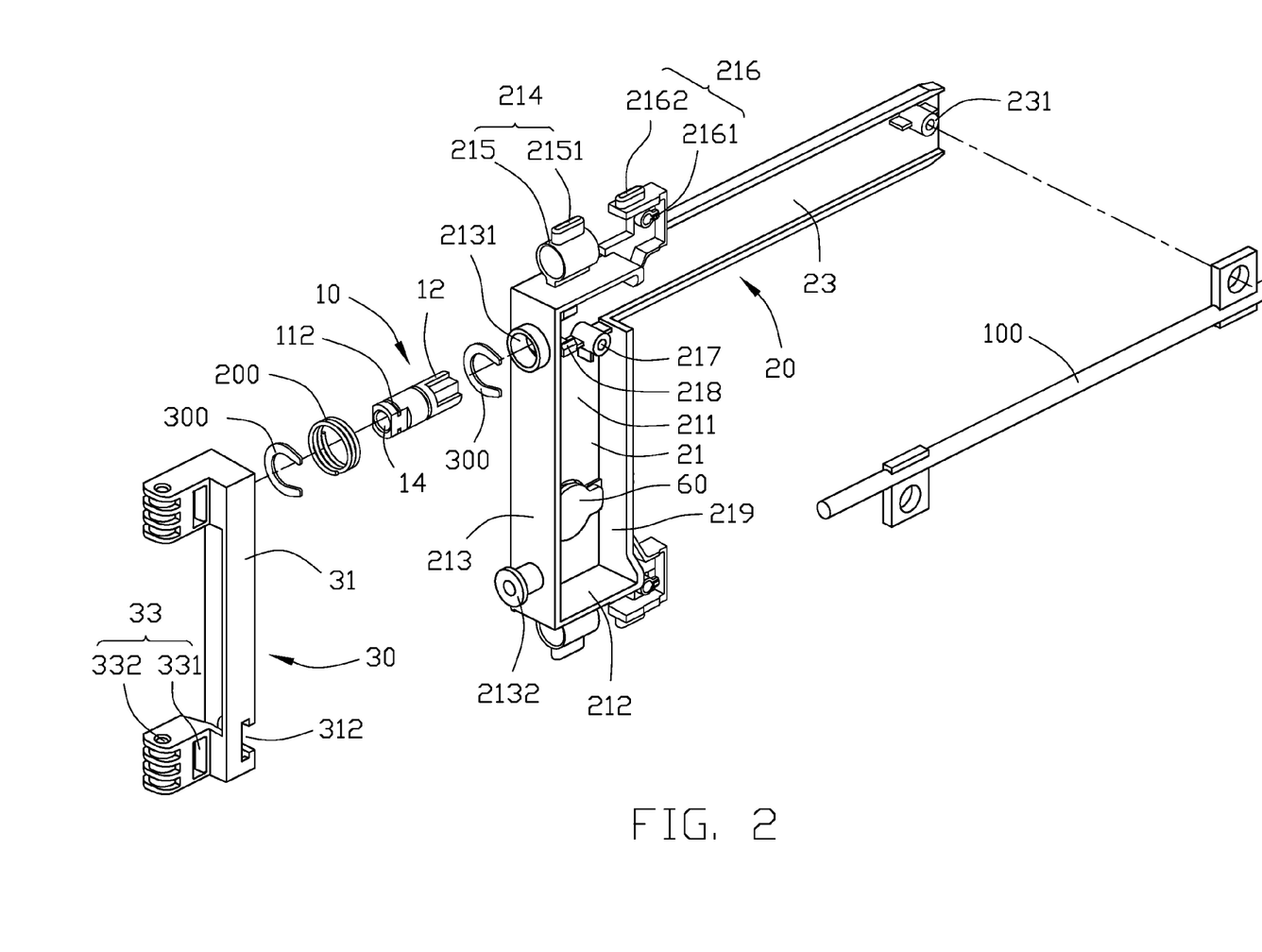
FIG. 2 is an exploded, isometric view of the support member, the connecting member, the sliding member, the bracket, and a cable of FIG. 1.

The support member 30 includes a connecting portion 31 and a pair of pivot portions 33 formed at opposite ends of the connecting portion 31. The connecting portion 31 defines a generally rectangular locating hole 311 at one end and a cutout 312 at another end thereof adjacent to the pivot portions 33. Each of the pivot portions 33 defines a receiving slot 331 for receiving the one first hook 421 of the LCD 40, and a second pivot hole 332 corresponding to the first pivot holes 411 of the LCD 40. Two first and second blocking tabs 3341, 3342 are formed on the each pivot portion 33, for engaging the first hooks 421 and the second hooks 422 of the LCD 40.

The sliding member 20 is generally L-shaped, and includes a support portion 21 and a sliding portion 23 generally perpendicular to the support portion 21. The support portion 21 includes a base wall 211, two parallel sidewalls 212 perpendicular to the base wall 211, a top wall 213 perpendicular to the base wall 211, the sidewalls 212, and a bottom wall 219 parallel to the top wall 213. A gear member 60 is secured on an inner surface of the first sidewall 21 of the support portion 21, and a gear portion extends out of the support portion 21. A pair of securing tabs 218 and a post 217 protrude from the inner surface of the base wall 211. A locking hole 2131 is defined in the top wall 213 corresponding to the locating hole 311 of the support member 30, and a positioning post 2132 is formed on the top wall 213 of the support portion 21 for engaging the cutout 312 of the support member 31. A locking portion 2133 is formed on an outer surface of the bottom wall 219. A first sliding block 214 and a second sliding block 216 are formed on an outer surface of the each of the sidewalls 212. Each of the first sliding blocks 214 includes a cylindrical portion 215 and a sliding tab 2151 formed on the cylindrical portion 215. Each of the second sliding blocks 216 forms a locking post 2161 and a sliding tab 2162. A post 231 protrudes from an inner surface of the sliding portion 23.

The connecting member 10 is generally columnar for engaging the locking hole 2131 of the sliding member 20, and has a generally rectangular end for engaging in the locating hole 311 of the sliding member 20. A plurality of blocking portions 12 is formed on the connecting member 10 for engaging with the securing tabs 218 of the sliding member 20. Two circular securing slots 112 are defined in the connecting member 10. A through hole 14 is defined and extends through the connecting member 10.

The bracket 50 includes a bottom plate 51, two parallel first side plates 52 parallel to the bottom plate 51, and two parallel second side plates 53 perpendicular to the bottom plate 51 and the first side plates 52. A through opening 511 is defined in the bottom plate 51. A rack 513 is formed on the bottom plate 51, and arranged along an edge of the through opening 511. Each of the first side plate 52 defines a sliding slot 521 therein for receiving the sliding tabs 214, 216 of the sliding member 20. An entry 531 is defined in one of the second side plate 53 of the bracket 50, so as to slide the sliding member 20 in the bracket 50 via the entry 531. A cutout 533 is defined in another second side plate 53 adjacent to one of the first side plates 52. A locking member 535 is fixed on another second side plate 53, for removably securing the locking portion 2133 of the sliding member 20.

Referring also to FIG. 3, during assembly, the connecting member 10 engages the locking hole 2131 of the sliding member 20, and the blocking portions 12 engage the securing tabs 218 of the sliding member 20. One of the securing slots 112 is positioned in the support portion 21. A securing member 300 engages the one securing slot 112, preventing the connecting member 10 from dislodging from the sliding member 20. A first spring 200 is disposed on the connecting member 10, and abuts the top wall 213 of the sliding member 20. The generally rectangular end of the connecting member 10 is received in the locating hole 311 of the support member 30, and the other securing slot 112 is positioned in the corresponding pivot portion 33. Another securing member 300 engages the other securing slot 112, thereby preventing the connecting member 10 from dislodging from the support member 30. A cable 100 can be secured in the sliding portion 23 of the sliding member 20, by engaging with the post 217, 231 of the sliding member 20, and is capable of engaging in the through hole 14 of the connecting member 10.

The sliding member 20 together with the support member 30 is received in the bracket 50 via the entry 531. The sliding portion 23 corresponds to the cutout 533 of the bracket 50.

The locking portion 2133 corresponds to the locking member 535. The gear member 60 of the sliding member 20 meshes with the rack 513 of the bracket 50. The sliding tabs 214, 216 are slidably engaged in the sliding slots 521 of the bracket 50. A second spring 400 engages each cylindrical portion 215 of the sliding member 20. One end of the second spring 400 engages with the locking post 2161 of the sliding member 20, the other end thereof engages with the locking post (not labeled) of bracket 50. The second springs 400 bias the sliding member 20.

The first hooks 421 of the LCD 40 are received in one of the receiving slots 331 of the pivot portions 33 of the support member 30, and engage the corresponding first blocking tabs 3341 of the pivot portions 33. The second hooks 422 of the LCD 40 abut the pivot portions 33 and is adjacent the second blocking tabs 3342. The first pivot holes 411 of the LCD 40 align with the second pivot hole 332 of the pivot portion 33, and two fasteners 80 are received in the first pivot holes 411 and the second pivot holes 332 to pivotally secure the LCD 40 on the support member 30. The LCD 40 can be thus rotated about the fasteners 80 relative to the support member 30.

Figure 4:
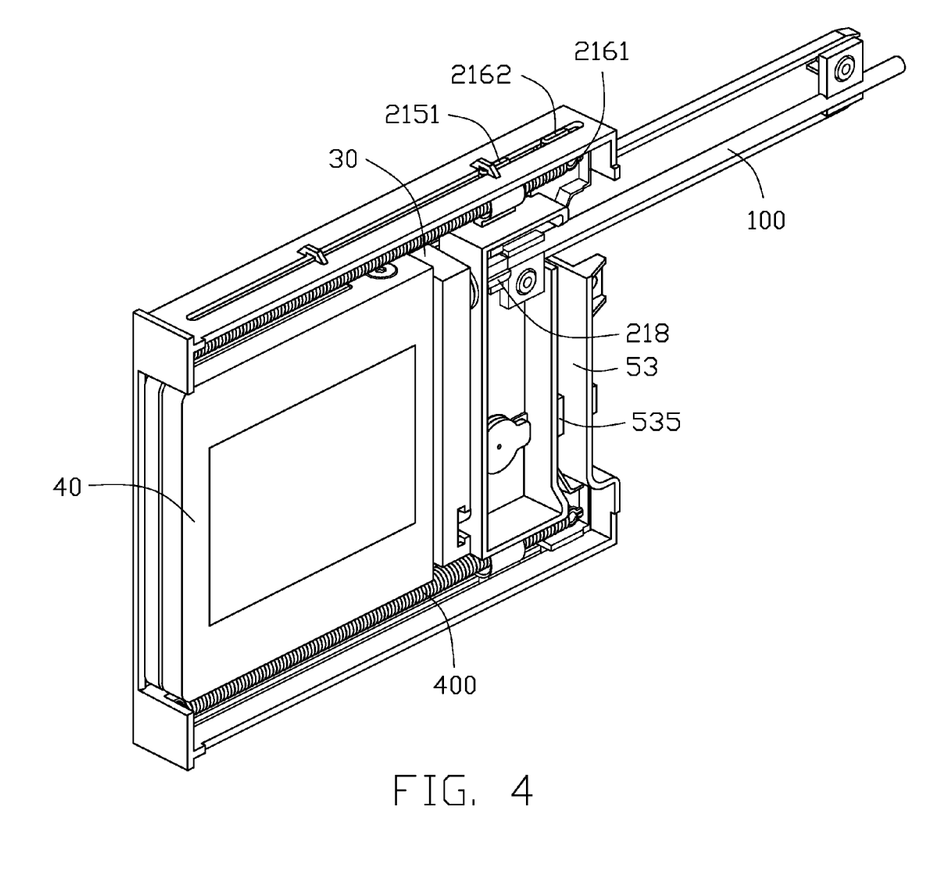
FIG. 4 is an assembled view of FIG. 3.
Figure 5:
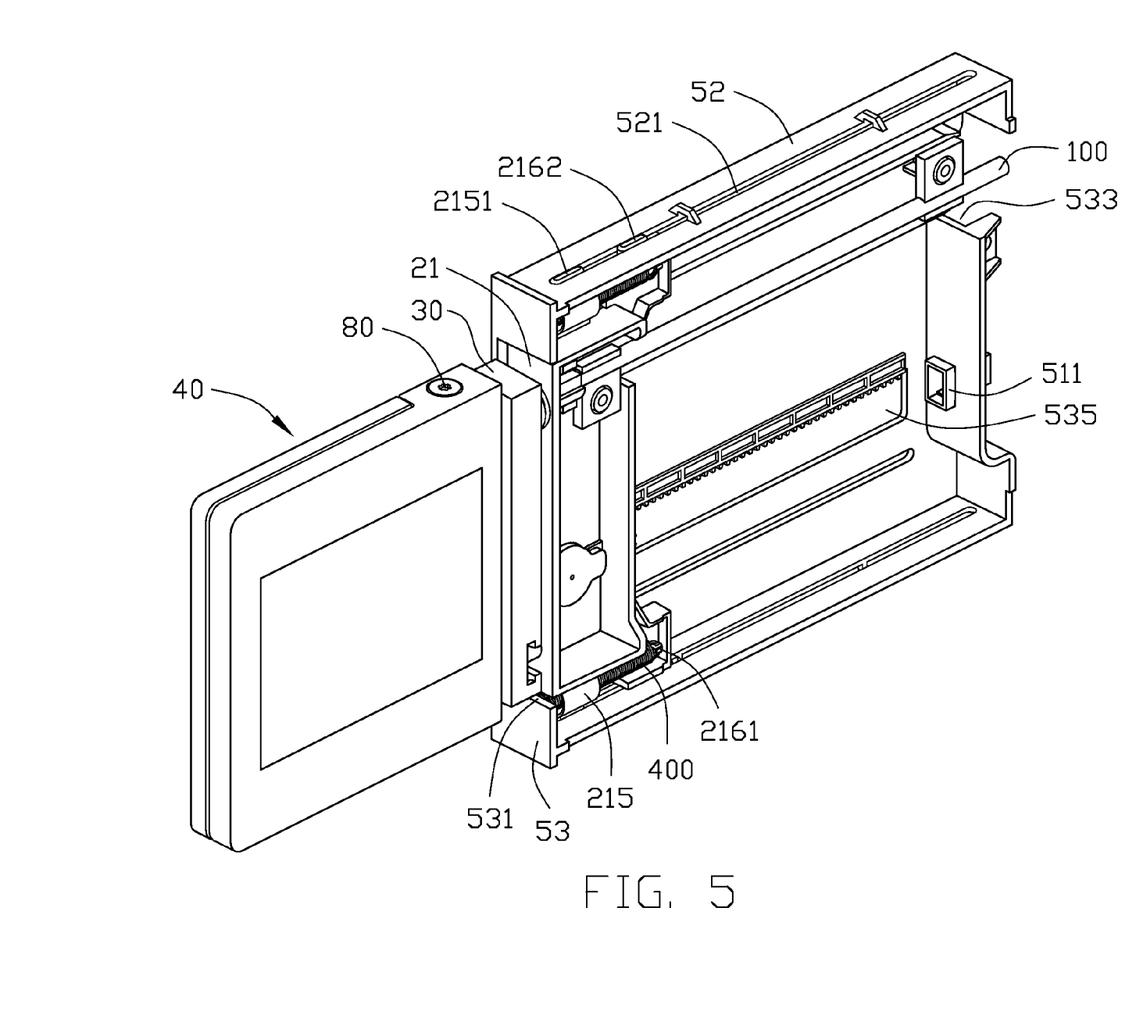
FIG. 5 is similar to FIG. 4, but shows the LCD extending out of the bracket.

Referring also to FIGS. 4-5, the first hook 421 of the LCD 40 engages the first blocking tab 3341 of the pivot portion 33 of the support member 30. The positioning post 2132 engages the cutout 312 of the support member 30. Thus, the LCD 40, the support member 30, and the sliding member 20 can be together slid in the bracket 50.

When the LCD 40 is slid in the bracket 50 toward the one second side plate 53 with the locking member 535, the sliding portion 23 of the sliding member 20 slides out of the bracket 50 via the cutout 533. The second springs 400 are resiliently deformed to elongate. The gear member 60 is rolled on the rack 513. The sliding tabs 214, 216 slide in the sliding slots 521 of the bracket 50. When the locking portion 2133 of the sliding member 20 engages the locking member 535 of the bracket 50, the LCD 40 is thus locked in the bracket 50.

Figure 6:
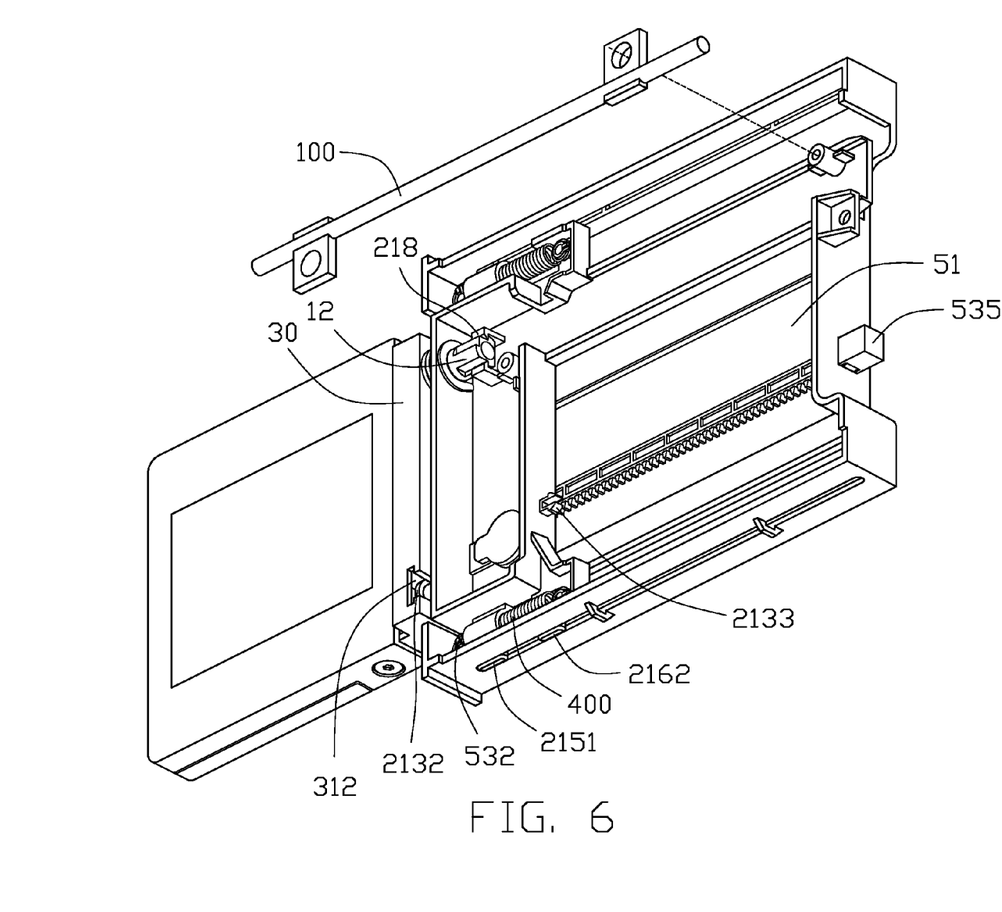
FIG. 6 is similar to FIG. 5, but shows the cable separated from the sliding member.

To extend out of the bracket 50 via the entry 531, the LCD 40 is pushed such that the locking member 535 releases the locking portion 2133 of the sliding member 20. The second springs 400 bias the sliding member 20 out of the bracket 50. When the first sliding blocks 214 of the sliding member 20 are blocked by the corresponding second side plate 53, the support member 30 extends out of the bracket 50.

Figure 7:
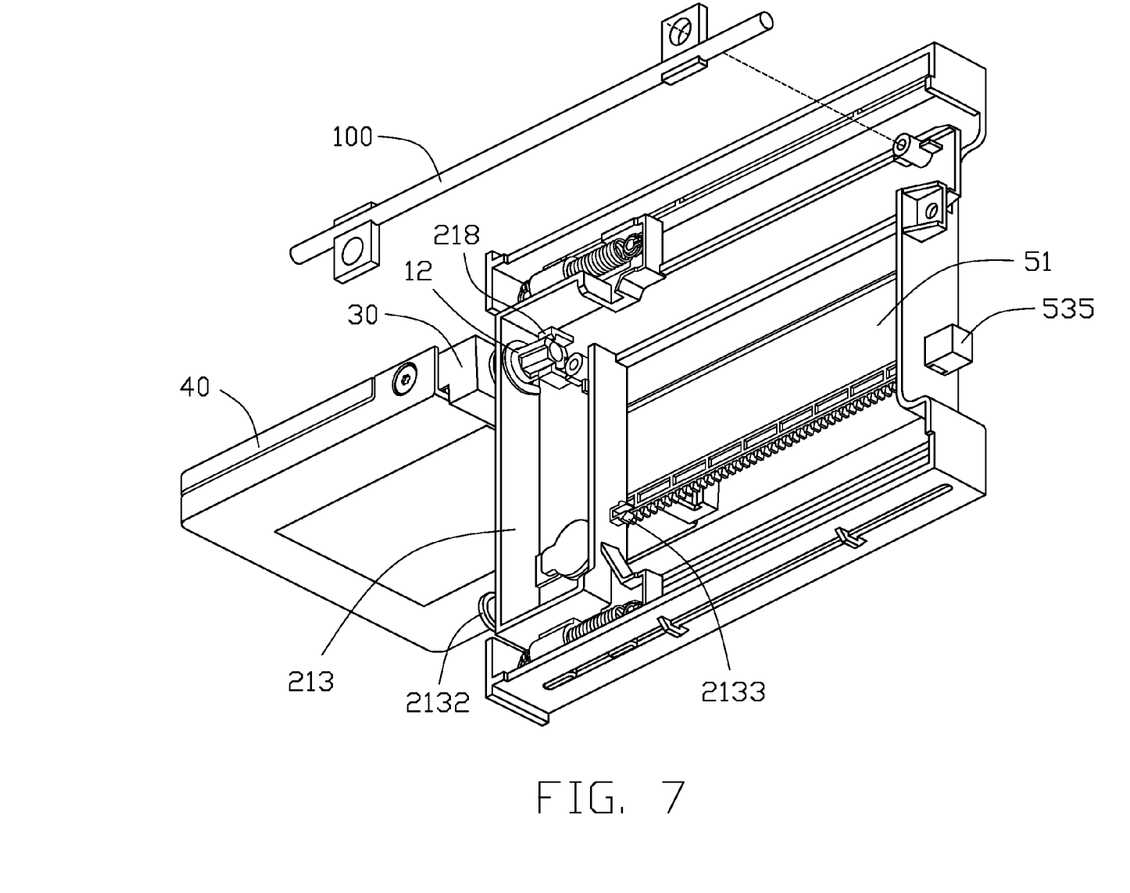
FIG. 7 is similar to FIG. 6, but shows the LCD and the support member rotated in a first direction.
Figure 8:
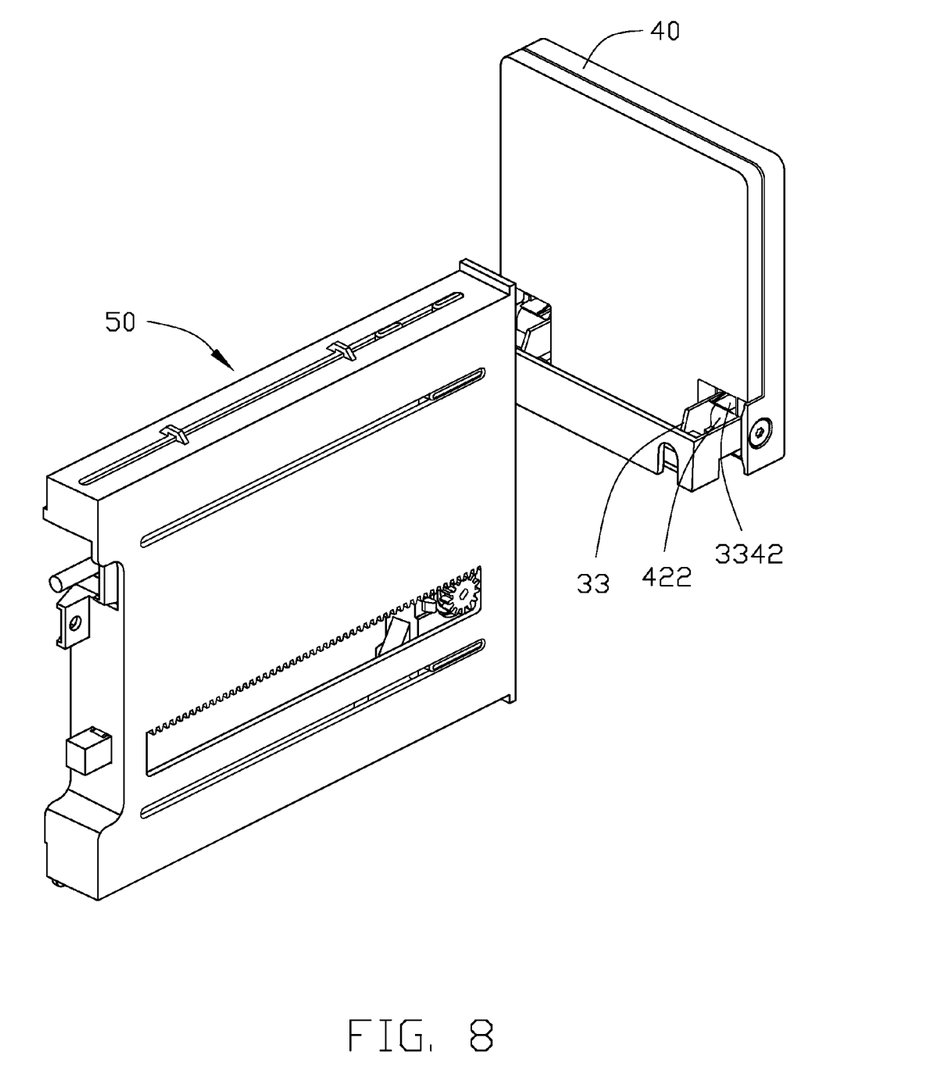
FIG. 8 is similar to FIG. 7, but viewed from another aspect, showing the cable assembled in the sliding member and the LCD rotated in a second direction.

Referring also to FIGS. 7-8, the support member 30 is rotatable about a first axis relative to the bracket 50. In rotating the support member 30 about the first axis, the connecting member 10 is rotated together with the support member 30 as the generally rectangular end thereof is received in the locating hole 311 of the support member 30. The blocking portions 12 are capable of resiliently deforming the securing tabs 218 of the sliding member 20 and disengaging it from the securing tabs 218 during rotation of the support member 30, so that the securing tabs 218 cannot block the connecting member 10 from rotating. Secured on the support member 30, the LCD 40 can also rotate about the first axis. When the LCD 40 together with the support member 30 is rotated to a predetermined position, the blocking portions 12 engage the securing tabs 218 again to prevent the LCD 40 and the support member 30 from rotating away from the predetermined position.

In addition, the LCD 40 is rotatable under force about the fasteners 80, a second axis generally perpendicular to the first axis. During rotation of the LCD 40 about the second axis, the first hooks 421 or the second hooks 422 of the LCD 40 are resiliently deformed by the corresponding pivot portions 33 of the support member 30 and disengaged from the first blocking tabs 3341 or the second blocking tabs 3342 of the pivot portion 33 of the support member 30 respectively, so that the first hooks 421 and the second hooks 422 cannot block the LCD 40 from rotating. When no force is applied to the LCD 40, the first hooks 421 and the second hooks 422 of the LCD 40 are capable of blocking the LCD 40 from rotating when engaging the second blocking tab 3342 of the pivot portion 33 of the support member 30.

The bracket 50 is mountable on a chassis (not shown) of an electronic device, such as a server or a computer. The LCD 40 is, accordingly, rotatable relative to the chassis about the first and second axes.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A Liquid Crystal Display (LCD) assembly comprising:
an LCD;
a support member pivotably engaging with the LCD so that the LCD is rotatable relative to the support member about a first axis;
a sliding member comprising two securing tabs;
a connecting member attached to the support member, the connecting member comprising a plurality of blocking portions; and the plurality of blocking portions pivotably engaged with the two securing tabs, so that the support member is rotatable relative to the sliding member about the connecting member;
a bracket receiving the sliding member, wherein the sliding member is slidable in the bracket.

2. The LCD assembly of claim 1, wherein first and second hooks are located on the LCD; first and second blocking tabs extend from the support member; and the LCD is rotatable between a first position in which the first hook engages the first blocking tab and a second position in which the second hook engages the second blocking tab.

3. The LCD assembly of claim 1, wherein a locking portion is located on the sliding member, and a locking member is located on the bracket and engaged with the locking portion.

4. The LCD assembly of claim 1, wherein the sliding member defines a locking hole for receiving the connecting member; the connecting member defines a securing slot therein; the securing slot is positioned in the sliding member when secured to the support member; and a securing member is secured in the securing slot to prevent the connecting member from dislodging from the locking hole of the support member.

5. The LCD assembly of claim 1, wherein the support member defines a cutout therein; a post is formed on the sliding member; and the supporting member is rotatable to engage the post.

6. The LCD assembly of claim 1, wherein the support member defines a locating hole for receiving the connecting member; the connecting member defines a first securing slot therein; the first securing slot is positioned in the support member when the connecting member is secured to the support member; a first securing member is secured in the first securing slot to prevent the connecting member from dislodging from the locating hole of the support member.

7. The LCD assembly of claim 1, wherein a first spring is disposed about the connecting member between the support member and the sliding member.

8. The LCD assembly of claim 1, wherein the bracket defines a sliding slot therein, and the sliding member forms a sliding tab that is slidable in the sliding slot.

9. The LCD assembly of claim 1, wherein a gear member is secured on the sliding member; and a rack located on the bracket meshes with the gear member.

10. The LCD assembly of claim 1, wherein a second spring is disposed between the bracket and the sliding member, and the sliding member is slidable relative to the bracket to resiliently deform the second spring.

11. An LCD assembly comprising:
an LCD, first and second hooks are formed on the LCD;
a support member; first and second blocking tabs are formed on the support member; the LCD pivotally engaging with the LCD so that the LCD is rotatable relative to the LCD about a first axis between a first position, in which the first hook engages the first blocking tab, and a second position, in which the second hook engages the second blocking tab;
a sliding member pivotally engaging with the support member so as to be rotatable relative to the support member about a second axis different from the first axis, a gear member being located on the sliding member; and
a bracket slidably engaging with the sliding member, a rack being located in the bracket to mesh with the gear member.

12. The LCD assembly of claim 11, wherein a locking portion is located on the sliding member, and a locking member is located on the bracket and engaged with the locking portion.

13. The LCD assembly of claim 11, wherein the sliding member defines a locking hole for receiving the connecting member; the connecting member defines a first securing slot therein; the first securing slot is positioned in the sliding member when the connecting member is secured to the support member; a first securing member is secured in the first securing slot to prevent the connecting member from dislodging from the locking hole of the support member.

14. The LCD assembly of claim 11, wherein the support member defines a cutout therein; a post is formed on the sliding member; and the supporting member is rotatable to engage the post in the cutout of the sliding member.

15. The LCD assembly of claim 11, wherein the support member defines a locating hole for receiving the connecting member; the connecting member defines a second securing slot therein; the second securing slot is positioned in the support member when the connecting member is secured to the support member; a second securing member is secured in the second securing slot to prevent the connecting member from dislodging from the locating hole of the support member.

16. The LCD assembly of claim 11, wherein a first spring is disposed about the connecting member between the support member and the sliding member.

17. The LCD assembly of claim 11, wherein the bracket defines a sliding slot therein; the sliding member forms a sliding tab that is slidable in the sliding slot.

18. The LCD assembly of claim 11, wherein a second spring is disposed between the bracket and the sliding member, and the sliding member is slidable relative to the bracket to resiliently deform the second spring.

19. A Liquid Crystal Display (LCD) assembly comprising:
an LCD;
a support member pivotally engaging with the LCD, so that the LCD is rotatable relative to the support member about a first axis;
a connecting member, attached to the support member, defining a first securing slot therein;
a sliding member defines a locking hole for receiving the connecting member; the first securing slot is positioned in the sliding member when the connecting member is secured to the support member; a first securing member is secured in the first securing slot to prevent the connecting member from dislodging from the locking hole of the support member; and
a bracket receiving the sliding member, wherein the sliding member is slidable in the bracket.

\* \* \* \* \*